[11] 3,625,966

[72] Inventor Christian H. Stapfer
Newtown, Pa.
[21] Appl. No. 695,342
[22] Filed Jan. 3, 1968
[45] Patented Dec. 7, 1971
[73] Assignee Cincinnati Milacron Chemicals Inc.

[54] BIOCIDAL TRIHYDROCARBYLTIN SALTS
2 Claims, No Drawings

[52] U.S. Cl. .................................................. 260/242,
106/15 R, 424/245
[51] Int. Cl. ................................................... C07f 7/22
[50] Field of Search ....................................... 106/15 AF;
260/242, 429.7

[56] References Cited
UNITED STATES PATENTS

| | | | |
|---|---|---|---|
| 3,236,793 | 2/1966 | Robins et al. ................. | 106/15 AF |
| ......... | ......... | ................. | 260/429.7 |
| 3,422,127 | 1/1969 | Fish .............................. | 260/429.7 |
| 3,458,549 | 1/1969 | Fish .............................. | 260/429.7 |

FOREIGN PATENTS

| | | | |
|---|---|---|---|
| 563,521 | 1/1958 | Belgium ....................... | 260/242 |
| 1,143,668 | 2/1963 | Germany ...................... | 260/429.7 |
| 39/15,690 | 8/1964 | Japan ........................... | 260/347.3 |

OTHER REFERENCES

Lesbre et al. Chem. Abst. Vol. 52, Columns 6165– 6166 (1958) QD1.A51

*Primary Examiner*—Natalie Trousof
*Attorneys*—Fritz G. Hochwald and Christen & Sabol

ABSTRACT: Trihydrocarbyltin salts of oxobenzothiazine acetic acids are used as biocides.

BIOCIDAL TRIHYDROCARBYLTIN SALTS

This invention relates to novel biocidal compositions which are useful against any kind of micro-organisms.

Organotin compounds containing one or more mercaptobenzothiazolate groups have already been proposed as biocides possessing fungicidal, bacterial, insecticidal, herbicidal and algicidal properties.

I have found organotin compounds which have a considerably higher biocidal efficiency than said known compounds. The novel compounds are triorganotin salts of oxobenzothiazine acetic acids and derivatives thereof.

The novel compounds have the formula

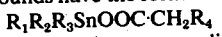

wherein $R_1$, $R_2$, and $R_3$ are the same or different hydrocarbyl groups, e.g., alkyl, alkenyl, aralkyl, aralkenyl, cycloalkyl, cycloalkenyl, aryl, or aralkyl; $R_4$ is an oxobenzothiazine radical on the ring of which one or two positions can be substituted with an aliphatic or aromatic hydrocarbon rest; preferably, the compounds have the general formula

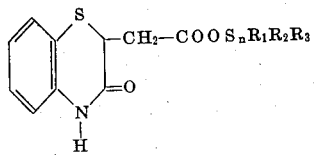

wherein $R_1$, $R_2$, and $R_3$ are alkyl groups, having one to 12 carbon atoms and are usually the same.

The starting benzothiazine acetic acid compounds can be prepared by condensation of the respective 1,2-amino aryl thiols with maleic acid or maleic anhydride, and said benzothiazine acetic acid compounds are then preferably reacted with an equimolar amount of a trihydrocarbyltin oxide in a suitable organic inert solvent such as hydrocarbon like, e.g., hexane, cyclohexane, benzene, toluene, at temperatures in the range of about 20° to 200° C. When using a trihydrocarbyltin halide, the reaction must be carried out in the presence of a HCl acceptor or with an alkali salt of the oxobenzothiazine acetic acid.

The trihydrocarbyltin oxobenzothiazine acetates are mostly solid salts which are stable to oxidation in air and resistant to hydrolysis. They are soluble in most organic solvents and plasticizers and have outstanding biocidal activity. They may be used with or without a conventional carrier, and alone or in combination with other biocides, in form of dusts, sprays, or fumigating agents. They are particularly suitable for incorporation in film-forming vehicles, paints, and the like where they can be used, preferably in concentrations of about 0.05 to 5 percent, calculated on the vehicle, with advantage to treat cloth, leather, and wood against fungal and bacterial deterioration. When incorporated, e.g., in vinyl coatings, it may be sufficient to use a mixture of bis (trihydrocarbyltin) oxide and the oxobenzothiazine acetic acid compound because these ingredients will form trihydrocarbyltin salt of the oxobenzothiazine acetic acid under the heat conditions employed in processing the vinyl compounds, e.g., poly (vinylchloride).

The following examples illustrate the preparation and the fungicidal properties and the use of the novel compounds.

EXAMPLE

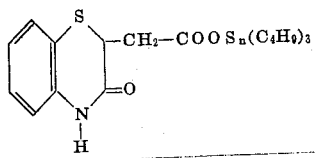

30 g. of 2-aminobenzenethiol were added slowly to 35 g. of pulverized maleic acid. The exothermic reaction caused the mixture to set to a hard mass. After the completion of the reaction by heating to 110° C. for 15 minutes, the reaction product was cooled, broken up and recrystallized in a 2:1 mixture of alcohol and water. Fifty grams of the white crystalline 2,3-dihydro-3-oxo-1,4-benzothiazine-2-acetic acid melting at 195° C. was obtained. Forty-six grams of this acid was suspended in 350 ml. of hexane and 61.5 g. of bis (tributyltin) oxide was added slowly. The theoretical amount of condensation water was condensed by azeotropic distillation and the reaction vessel was cooled.

Crystallization occurred readily and a quantitative amount of the tributyl tin dihydro-oxo-benzothiazine acetate melting at 121° C. was obtained.

| | |
|---|---|
| Sn, calculated for $C_{22}H_{35}O_3NSSn$ | = 23.2% |
| Found | = 23.1% |

EXAMPLE 2

Two brush coats of three paint formulations containing various levels of fungicide were successively applied uniformly to 1 square inch 01 filter papers. After drying, the painted filter paper squares were dipped briefly in boiling water and placed on standard malt Agar plates seeded with an actively growing 7-day old culture of Pullularia pullulans The plates were then incubated at 28° C. for a period of 4 weeks and observations were made weekly during the incubation period.

Three different paint formulations were used.

A. Polyvinyl Acetate Paint (PVA) of the composition

| | |
|---|---|
| Methyl Cellulose 2% | 0.9 lbs. |
| Titanium Pigment | 1.65 lbs. |
| Magnesium Silicate | 0.51 lbs. |
| 325 Mesh Mica | 0.30 lbs. |
| Water | 1.2 lbs. |
| Flexbound 800 (vinyl acetate-vinyl chloride copolymer; 53% solids) | 2.35 lbs. |
| Wetting Agents, antifoaming agents, freeze thaw stabilizer | 0.3 lbs. |

B. Styrene-Butadiene Paint (S-B) of the composition

| | |
|---|---|
| Titanium Dioxide | 1.6 lbs. |
| Clay | 0.5 lbs. |
| Calcium Carbonate | 1.1 lbs. |
| Methyl Cellulose 2% | 1.4 lbs. |
| Water | 0.95 lbs. |
| Styrene-Butadiene emulsion (Dow latex 307; 48% solids) | 2.1 lbs. |
| Wetting agents, antifoaming agents, freeze thaw stabilizer | 0.3 lbs. |

C. Acrylic Paint (ACR) of the composition

| | |
|---|---|
| Titanium Pigment | 1.05 lbs. |
| Calcium Carbonate | 2.25 lbs. |
| Methyl Cellulose 2% | 0.61 lbs. |
| Water | 0.96 lbs. |
| Acrylic Emulsion (Rhoplex AC 34; 47% solids) | 2.43 lbs. |
| Wetting Agents, freeze thaw stabilizer antifoaming agents | 0.3 lbs. |

The lowest level of tributyl tin-2,3-dihydro-3-oxo-1,4-benzothiazine-2-acetate effective against Pullularia pullulans in the three paint systems is given in the table below, in comparison to the lowest effective level of tributyltinmercaptobenzothiazole.

| | PVA | S-B | ACR |
|---|---|---|---|
| Tributyltindihydro-oxo-benzothiazine acetate | 0.1% | 0.2% | 0.1% |
| Tributyltin mercapto-benzothiazole | 0.1% | 0.2% | Failure |

The table shows that the tributyltin dihydro-oxo-benzothiozine acetate had, in the PVA and S-B paints, the same biocidal effect as tributyltin mercaptobenzothiazole.

However, in the acrylic paint, where the latter compound was ineffective, the tributyltin dihydro-oxo-benzothiazine acetate was effective already at the very low concentration of 0.1 percent.

EXAMPLE 3

A similar procedure was carried out using the same three paint systems as employed in example 2 with a culture of Aspergillus oryzae on a mineral salts sucrose agar medium. After a period of incubation of 7 days at 28°–30° C., the following minumum effective levels in the three paint systems were as follows:

|  | PVA | S–B | ACR |
|---|---|---|---|
| Tributyltin dihydro-oxo-benzothiazine acetate | 0.05% | 0.1% | 0.1% |
| Tributyltin mercapto-benzothiazole | 0.2% | 0.2% | 0.3% |

In all paint systems, the required effective amount of the tributyltin dihydro-oxo-benzothiazine acetate was at least 100 percent lower than that of the tributyltin mercapto benzothiazole.

EXAMPLE 4

A red iron oxide paint containing 140 g. of red iron oxide, 88 g. of clay, 200 g. of zinc oxide, 400 g. of water white rosin solution (at 65 percent), 80 g. of coat tar, 80 g. of pure oil and 120 g. of high flash naphtha was applied to a cedar wood panel measuring 36 inches · 6 inches · 1 inches and used as a standard. An identical panel was coated with the same paint containing 2 percent of tributyltin-2,3-dihydro-3-oxo-1,4-benzothiazine acetate and a third panel was protected with 2 percent of tributyltin mercaptobenzothiazole. The panels were then immersed in a marine environment for 120 days (costal sea water, state of New Jersey).

After 60 days the unprotected panel showed considerable calcarious growth, some calcarious growth was observed on the panel treated with the organotin mercaptobenzothiazole compound, whereas the panel coated with the paint containing tributyltin oxobenzothiazine acetate still showed complete protection. After 90 days this trend increased and 50 percent more barnacles had grown on the panel treated with the mercapto benzothiazole.

After 120 days the difference between the tributyltin mercapto benzothiazole and the tributyltin oxobenzothiazine acetate was even greater and a hard slime covered 40 percent of the panel treated with the former compound vs. 20 percent with the latter.

EXAMPLE 5

Tests for mildew resistance imparted by the fungicides of the invention were carried out according to Federal Specification CCC-T-191 b Method 5751.1 (May 6, 1953) as follows:

Solutions of respectively 10, 5, 4, 3, 2 and 1 percent of tributyltin dihydro-oxo-benzothiazine acetate in methyl ethyl ketone were prepared and a piece of untreated cotton cloth was dipped in each solution for several minutes to deposit a sufficient quantity of fungicide. A piece of the same cloth was left unprotected and used as a control. The test samples were then air dried and placed with the control on a nutrient agar inoculated with the organism Chaetomium Globosum. During a 14-day incubation at 30° C, the control failed after 7 days whereas the treated samples passed the 14-day test at all levels while inhibiting all fungus growth.

I claim:

1. An organotin compound having the formula

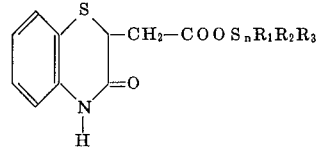

wherein $R_1$, $R_2$ and $R_3$ are alkyl of one to 12 carbon atoms.

2. The compound of claim 1 wherein $R_1$, $R_2$ and $R_3$ are butyl.

* * * * *